C. K. WHITE.
FENDER FOR AUTOMOBILES.
APPLICATION FILED AUG. 26, 1914.
1,139,830.
Patented May 18, 1915.
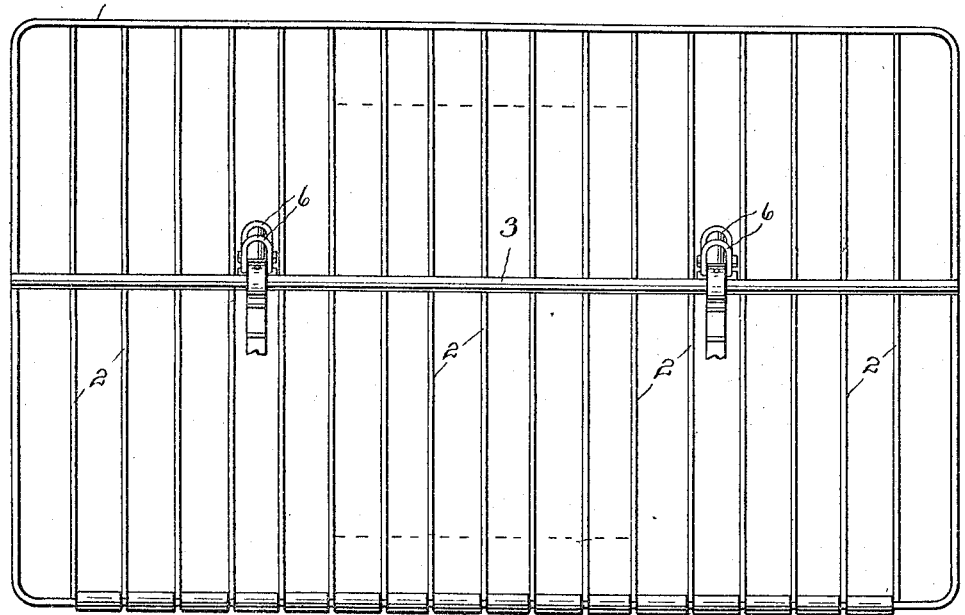
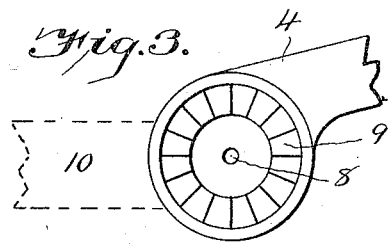
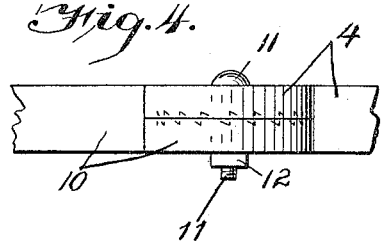
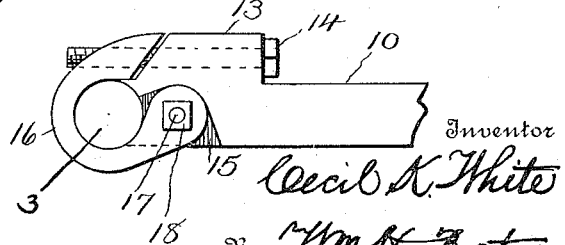

UNITED STATES PATENT OFFICE.

CECIL K. WHITE, OF NORFOLK, VIRGINIA.

FENDER FOR AUTOMOBILES.

1,139,830.  Specification of Letters Patent.  Patented May 18, 1915.

Application filed August 26, 1914. Serial No. 858,720.

*To all whom it may concern:*

Be it known that I, CECIL K. WHITE, a citizen of the United States, residing at Norfolk, in the county of Norfolk and State of Virginia, have invented certain new and useful Improvements in Fenders for Automobiles, of which the following is a specification.

My invention relates to a certain new and useful improvement in fenders for automobiles and has for its object the production of a fender which may be readily adapted to automobiles of varying width or height, and when connected with an automobile may be adjusted with reference thereto both as to height and the angle of inclination.

With these and other objects in view my invention consists in the details of construction and arrangement hereinafter more fully set forth.

In order that those skilled in the art to which my invention appertains may know how to make my improved fender and apply the same to an automobile and appreciate its advantages I will proceed to describe the same, referring by numerals to the accompanying drawing in which—

Figure 1 is a front elevation of the fender and its attachment to the springs of an automobile, the springs being shown as broken away in the lower leaves. Fig. 2 is a side elevation with the spring also broken away. Fig. 3 is a detail inside view on an enlarged scale of one part of the means employed for securing the vertical adjustment. Fig. 4 is a detail top or plan view of the adjusting connection, and Fig. 5 is a detail side view on an enlarged scale of the arm forming part of the means for securing vertical adjustment of the fender and which is adapted at its front or free end to secure the fender in place and permit of its being adjusted with reference to its inclination toward the road, and to also permit it to automatically drop at its front end when contacting with a body or obstruction which it is desirable to prevent from coming under the wheels of the automobile.

Similar reference numerals indicate like parts in the several figures of the drawing.

1 is a rectangular frame, composed of metal tubing or bars of any suitable or desired size in cross section and with upright tubes or bars 2 to constitute a suitable netting like structure to pick up and carry a body or other movable obstruction.

3 is a transverse round bar or tube arranged about central of the frame and securely fastened to the ends of the frame and the intermediate upright bars 2, and this bar or tube 3 constitutes part of the means by which the fender is secured in position upon an automobile.

Having now described the fender *per se*, I will now describe the means by which it is secured in position and may be adjusted vertically and as to inclination and adapted to automatically drop at its lower extremity when it contacts with a movable obstruction.

4 are two comparatively short bracket arms adapted in longitudinal curvature on the under side to coincide snugly with the top surface of the side frame bars 5, and they are securely connected therewith by suitable clips and nuts 7, in an obvious manner. The forward ends of these arms are circular in form with a central transverse bolt hole 8, and with interior V-shaped depressions 9, as clearly shown in Fig. 3.

Forwardly of each of the bracket arms 4 is a supporting arm 10, the rear end of which is circular in form, has a central transverse bolt hole similar to the bolt hole 8 of the bracket arm 4, and its interior surface is provided with V-shaped depressions or notches similar to those in the bracket arm 4, so that the two arms may be adjustably and axially connected by a bolt 11, and a nut 12, as clearly shown at Fig. 4, and when they are brought tightly together with the V-shaped notches interlocked it will be obvious that the two arms cannot move axially.

The forward end of the supporting arm 10 is enlarged, as shown at 13, to provide sufficient stock to receive a metal screw 14, and the extremity of this arm is curved and adapted to contact with the rear periphery of the central tube or rod 3 of the fender. The side of this arm at its forward extremity is formed with a recess 15 adapted to receive the rear end of a ring shaped clamp hook 16, the free end of which is enlarged and threaded interiorly to receive the metal screw 14 and the extremity of this clamp hook and the forward extremity of the enlargement 13 of the supporting arm 10, are inclined, as shown at Fig. 5, and spaced to a sufficient degree to permit of a limited adjustment with reference to the central bar 3 of the fender which is embraced as shown at Fig. 2. The clamp hook 16 is pivotally connected in the recess 15 of the supporting arm by a transverse bolt 17 and jam nut 18.

When the fender is designed for use in connection with automobiles which have to be cranked, the fender is formed with a gate in any suitable manner as is diagrammatically indicated by dotted lines in Fig. 1.

From the construction shown and described it will be readily seen that in attaching the fender to machines in which the distance between the front springs may vary, it is only necessary to see that the connecting arms are in alinement with the proper spaces between the vertical bars 3 of the fender.

When it is necessary to adjust the fender to machines of different heights, it is only necessary to loosen the nuts 18 on the bolts 17, and vibrate the supporting arm 10 to raise or lower the fender, as the case may be; when properly adjusted, the nut 18 is again tightened.

When it is desired to change the angle or inclination of the fender, it is only necessary to loosen the nut 18 on the supporting hook bolt 17, when the central rod 3 of the fender may be readily rotated within the end of the supporting arm 10 and then secured in its adjusted position by again tightening the nut 18. In securing the fender so that it may automatically drop when contacting with a movable obstruction, the clamp hook 16 should be caused to clamp the bar 3 sufficiently to hold the fender under ordinary conditions and yet allow the bar 3 to rotate when the fender meets the obstruction. The lower bar of the frame 1 is provided between the vertical bars 2 with rubber rollers 19, adapted to constitute cushions for any obstruction met and to also take up the shock of contact with the road bed. These rollers may be used to any desired extent and preferably they should be omitted between the extreme ends of the frame.

As clearly shown at Fig. 2, the fender is made of S-form or is reversely curved in order that, in picking up an obstruction, the same will be relieved from excessive shock.

I have not described any particular proportions, cross-section or weight of the material composing the fender as it may be varied in all of the particulars without departing from the spirit of my invention.

What I claim as new and desire to secure by Letters Patent is:—

The combination of bracket arms adapted to be secured to the side frame bars of an automobile, supporting arms adjustably connected with the bracket arms, a clamp-hook pivoted at one end to each of the supporting arms, a screw passing through and adapted to hold the other end of the clamp hook, and a fender frame provided with a transversely extending central bar adapted to fit in the clamp hooks and be rigidly held thereby.

In testimony whereof I affix my signature in presence of two witnesses.

CECIL K. WHITE.

Witnesses:
JOHN L. FLETCHER,
FLORENCE V. DONN.

Copies of this patent may be obtained for five cents each, by addressing the "Commissioner of Patents, Washington, D. C."